US010126987B2

(12) United States Patent
Jin et al.

(10) Patent No.: US 10,126,987 B2
(45) Date of Patent: Nov. 13, 2018

(54) STORAGE DEVICES AND METHODS FOR CONTROLLING A STORAGE DEVICE

(71) Applicant: MARVELL INTERNATIONAL LTD., Hamilton (BM)

(72) Inventors: Chao Jin, Singapore (SG); WeiYa Xi, Singapore (SG); Alexopoulos Pantelis, Singapore (SG); Chun Teck Lim, Singapore (SG); Zhi Yong Ching, Singapore (SG)

(73) Assignee: Marvell International Ltd., Hamilton (BM)

( * ) Notice: Subject to any disclaimer, the term of this patent is extended or adjusted under 35 U.S.C. 154(b) by 779 days.

(21) Appl. No.: 14/058,156

(22) Filed: Oct. 18, 2013

(65) Prior Publication Data

US 2014/0115240 A1 Apr. 24, 2014

Related U.S. Application Data

(60) Provisional application No. 61/715,305, filed on Oct. 18, 2012.

(51) Int. Cl.
*G06F 3/06* (2006.01)
*G06F 1/32* (2006.01)

(52) U.S. Cl.
CPC .......... *G06F 3/0685* (2013.01); *G06F 1/3268* (2013.01); *G06F 3/0611* (2013.01); *G06F 3/0625* (2013.01); *G06F 3/0647* (2013.01); *G06F 3/0661* (2013.01); *Y02D 10/154* (2018.01)

(58) Field of Classification Search
CPC .... G06F 3/0685; G06F 3/0604; G06F 3/0647; G06F 3/0611; G06F 3/0625; G06F 3/0661; G06F 1/3268; Y02D 10/154

USPC ............................................... 710/1; 711/103
See application file for complete search history.

(56) References Cited

U.S. PATENT DOCUMENTS

| 6,032,224 | A | * | 2/2000 | Blumenau ............... G06F 12/08 710/15 |
| 8,793,429 | B1 | * | 7/2014 | Call et al. ..................... 711/103 |
| 2009/0059658 | A1 | * | 3/2009 | Cho et al. ..................... 365/163 |
| 2009/0100244 | A1 | * | 4/2009 | Chang et al. .................. 711/172 |
| 2010/0142350 | A1 | * | 6/2010 | Chung et al. .................... 369/85 |
| 2010/0217966 | A1 | * | 8/2010 | Shim ............................... 713/2 |
| 2011/0107347 | A1 | * | 5/2011 | Raisch et al. .................. 719/313 |
| 2011/0264635 | A1 | * | 10/2011 | Yang .................. G06F 11/1412 707/695 |
| 2011/0304939 | A1 | * | 12/2011 | Hirata et al. .................. 360/110 |

OTHER PUBLICATIONS

An-I A. Wang, Peter Reiher, Gerald J. Popek (all associated with UCLA), Geoffrey H. Kuenning (Harvey Mudd College), "Position Summary: The Conquest File System—Life After Disks", IEEE Conferences, "Proceedings Eighth Workshop on Hot Topics in Operating Systems", p. 186. (Year: 2001).*

* cited by examiner

*Primary Examiner* — Henry Tsai
*Assistant Examiner* — John B Roche

(57) ABSTRACT

According to various embodiments, a storage device may be provided. The storage device may include: a first memory including a magnetic recording medium and configured to store user data; a second memory including a solid state drive recording medium and configured to store at least one of metadata or other frequently accessed data; and an interface configured to access the second memory using a pre-determined communication protocol.

17 Claims, 7 Drawing Sheets

STORAGE DEVICES AND METHODS FOR CONTROLLING A STORAGE DEVICE

CROSS-REFERENCE TO RELATED APPLICATIONS

The present application claims the benefit of the U.S. provisional patent application No. 61/715,305 filed on 18 Oct. 2012, the entire contents of which are incorporated herein by reference for all purposes.

TECHNICAL FIELD

Embodiments relate generally to storage devices and methods for controlling a storage device.

BACKGROUND

Mobile devices such as mobile phones or handheld computers are using increasing amounts of storage for programs and data. Thus, there may be a need for an efficient and effective storage for mobile devices.

SUMMARY

According to various embodiments, a storage device may be provided. The storage device may include: a first memory including a magnetic recording medium and configured to store user data; a second memory including a solid state drive recording medium and configured to store at least one of metadata or other frequently accessed data; and an interface configured to access the second memory using a pre-determined communication protocol.

According to various embodiments, a method for controlling a storage device may be provided. The method may include: controlling a first memory including a magnetic recording medium to store user data; controlling a second memory including a solid state drive recording medium to store metadata; and controlling an interface to access the second memory using a pre-determined communication protocol.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices are analogously valid for the respective methods, and vice versa. Furthermore, it will be understood that the embodiments described below may be combined, for example, a part of one embodiment may be combined with a part of another embodiment.

In this context, the storage device as described in this description may include a memory which is for example used in the processing carried out in the storage device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Mobile devices such as mobile phones or handheld computers are using increasing amounts of storage for programs and data. Thus, there may be a need for an efficient and effective storage for mobile devices.

General purpose file systems are normally designed to manage single continuous storage space and they mix metadata and data together. Metadata are the data to describe data. That is, all the data and metadata are kept in the single disk media. One of the main problems of keeping metadata and data together in the disk media is that accessing the metadata, for example when user browse file directory, may cause disk spindle power on due to cache miss. In addition, general purpose file systems cannot be used to manage shingled writing disk (wherein shingled (in other words: overlapping) data tracks are provided), a technology for high capacity and density disk drive which will soon be seen in the market.

According to various embodiments, a new hybrid file system (HybridFS) may be provided which may be used for a phone server (for example providing storage space to mobile devices) to extend the phone server battery life and improve system performances. HybridFS may adopt log style write to the storage and may be used directly to manage and access shingled writing disks.

According to various embodiments, devices and methods may be provided to access and allocate data to the NVM (non-volatile memory) in detail with current ATA8 (AT attachment 8) NV (non-volatile) cache command sets and banded drive standards processing in T13 (a group of International Committee for Information Technology Standards).

The data management and file system design according to various embodiments may be suitable for the phone sever with a hybrid drive as a storage. The hybrid drive may include NVM and disk media which may be either one or more shingled writing disks or one or more non-shingled writing disks or a mixture of shingled and non-singled writing disks. In addition, it may also be suitable for a system with two separate storages. One may be a conventional HDD or a 100% shingled magnetic recording disk and the other may be NVM based solid state storage.

For the former case, the phone server may have only one hybrid storage device, and to improve system performance through efficiently move the data between the NVM and the disk media, instead of conventional way of reading the data out from one media to the system first and then write the data from the system to the other storage media, according to various embodiments, the data may be moved directly from one media to the other without pass through the system which is more efficient and much faster.

Figure 1A:
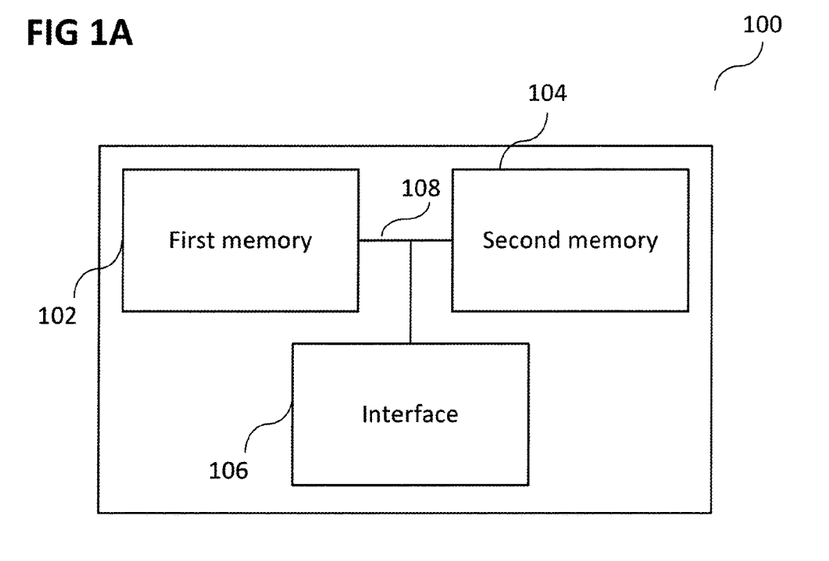
FIG. 1A shows a storage device according to various embodiments.

FIG. 1A shows a storage device 100. The storage device 100 may for example be a phone server. The storage device 100 may include a first memory 102 including a magnetic recording medium and configured to store user data. The storage device 100 may further include a second memory 104 including a solid state drive recording medium and configured to store at least one of metadata or other frequently accessed data. The storage device 100 may further include an interface 106 configured to (e.g. directly) access the second memory using a pre-determined communication protocol. The first memory 102, the second memory 104, and the interface 106 may be coupled with each other, like indicated by lines 108, for example electrically coupled, for example using a line or a cable, and/or mechanically coupled.

In other words, the storage device 100 may include a magnetic storage portion and a solid state drive storage portion, and access may be granted to the magnetic storage portion from outside the storage device 100.

According to various embodiments, the pre-determined communication protocol may include or may be an ATA8 NV command set (or an ATA8 NV protocol) and/or a SATA command set (or a SATA protocol).

According to various embodiments, the first memory 102 may further be configured to store cold user data.

According to various embodiments, the second memory 104 may further be configured to store hot user data.

According to various embodiments, the interface 106 may further be configured to provide access to a pinned portion of the second memory 104.

Figure 1B:
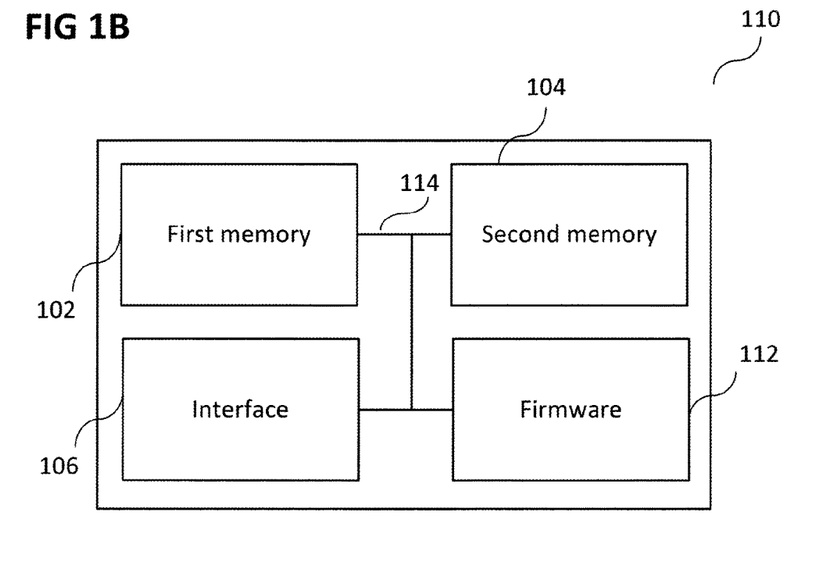
FIG. 1B shows a storage device according to various embodiments.

FIG. 1B shows a storage device 110 according to various embodiments. The storage device 110 may, similar to the storage device 100 of FIG. 1A, include a first memory 102. The storage device 110 may, similar to the storage device 100 of FIG. 1A, further include a second memory 104. The storage device 110 may, similar to the storage device 100 of FIG. 1A, further include an interface 106. The storage device 110 may further include a firmware 112, like will be described in more detail below. The first memory 102, the second memory 104, the interface 106, and the firmware 112 may be coupled with each other, like indicated by lines 114, for example electrically coupled, for example using a line or a cable, and/or mechanically coupled.

According to various embodiments, the firmware 112 may be configured to receive a command from a host to copy data between the first memory 102 and the second memory 104.

According to various embodiments, copying of data between the first memory 102 and the second memory 104 may be free from the host receiving the data (in other words: may not include that the host receives the data).

According to various embodiments, the first memory 102 may include or may be a conventional hard disk drive.

According to various embodiments, the first memory 102 may include or may be a shingled magnetic recording disk.

According to various embodiments, the first memory 102 may include or may be a magnetic recording portion of a hybrid drive. According to various embodiments, the second memory 104 may include or may be a solid state drive portion of the (same) hybrid drive.

Figure 1C:
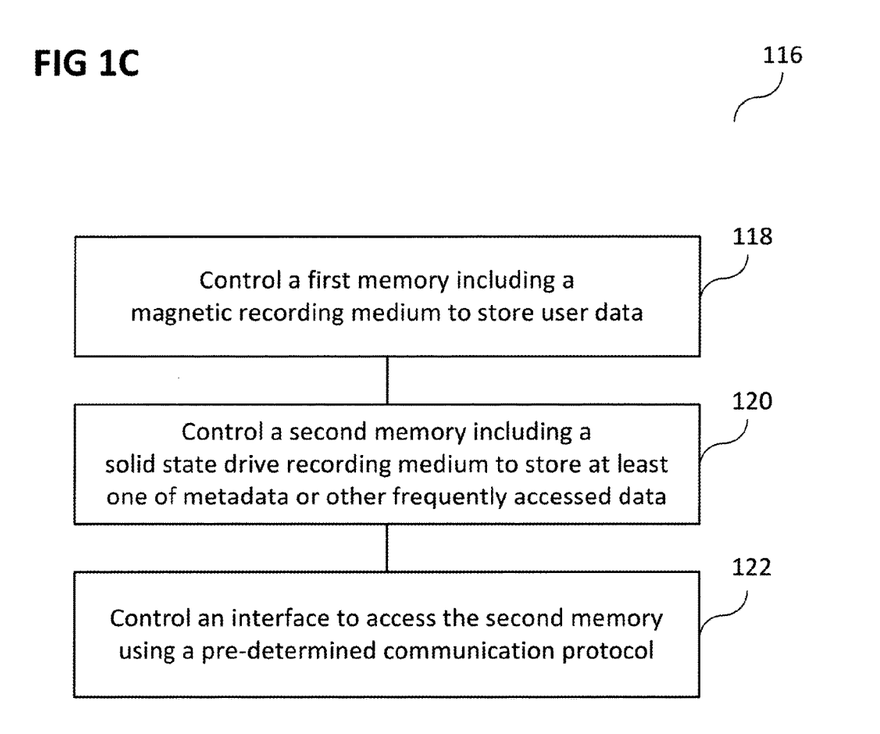
FIG. 1C shows a flow diagram illustrating a storage device according to various embodiments.

FIG. 1C shows a flow diagram 116 illustrating a method for controlling a storage device. In 118, a first memory including a magnetic recording medium may be controlled to store user data. In 120, a second memory including a solid state drive recording medium may be controlled to store at least one of metadata or other frequently accessed data. In 122, an interface may be controlled to access the second memory using a pre-determined communication protocol.

According to various embodiments, the pre-determined communication protocol may include or may be an ATA8 NV command set (or an ATA8 NV protocol) and/or a SATA command set (or a SATA protocol).

According to various embodiments, the first memory may store cold user data.

According to various embodiments, the second memory may store hot user data.

According to various embodiments, the method may further include controlling the interface to provide access to a pinned portion of the second memory.

According to various embodiments, the method may further include receiving a command from a host to copy data between the first memory and the second memory.

According to various embodiments, copying of data between the first memory and the second memory may be free from the host receiving the data.

According to various embodiments, the first memory may include or may be a conventional hard disk drive.

According to various embodiments, the first memory may include or may be a shingled magnetic recording disk.

According to various embodiments, the first memory may include or may be a magnetic recording portion of a hybrid drive. According to various embodiments, the second memory may include or may be a solid state drive portion of the (same) hybrid drive.

Figure 2:
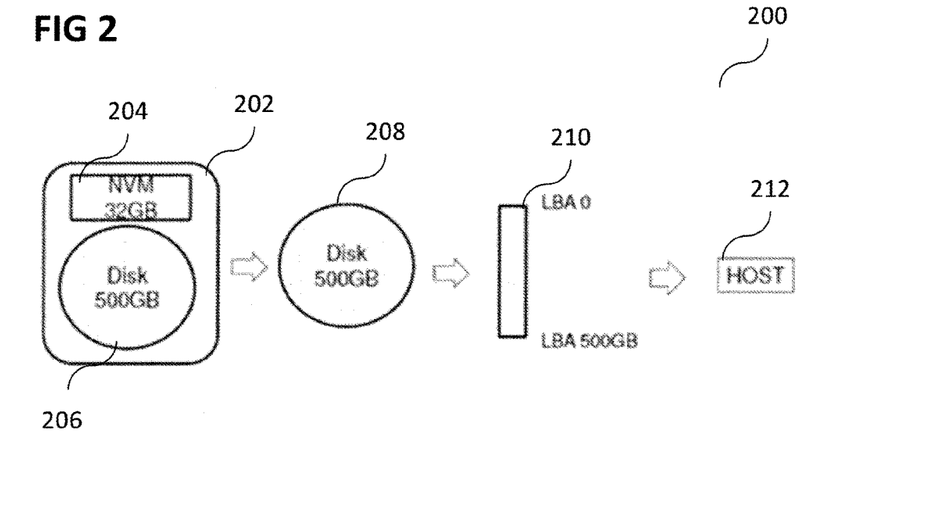
FIG. 2 shows a hybrid drive interface to a host according to various embodiments.

FIG. 2 shows an illustration 200 of how a hybrid drive 202 interfaces to a host 212, for example in a hybrid drive cache mode. The hybrid drive 202 may include a NVM 204 and a disk 206. The hybrid drive presents to the host 212 as single continuous addressable space of the disk media capacity, like indicated in 208. There is no address of the NVM exposed for the host 212 to access. The host 212 accesses the NVM through PIN (wherein PIN for example may be an ATA-8 command that pins LBA (Logical block addressing) in the pinned table set) disk LBA addresses through standard ATA8 NV command sets. In other words: The host 212 may use ATA8 NV cache commands to access the NV cache. The host 212 may access the disk media 206 through LBA0 to LBA for the size of the disk media (for example LBA 500 GB for a disk media having a storage capacity of 500 GB), like indicated in 210.

Figure 3:
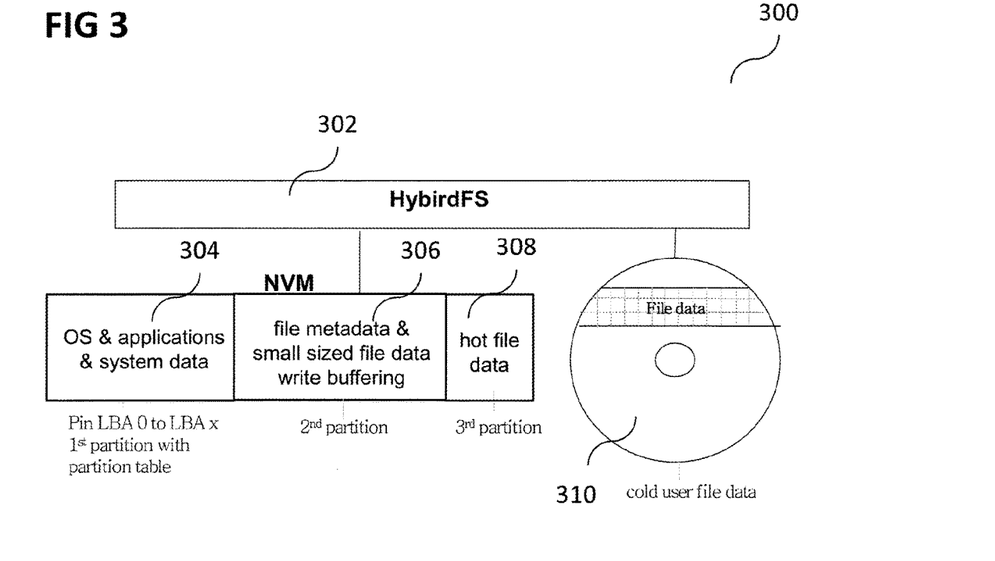
FIG. 3 shows an illustration of data allocation and management for NVM (non-volatile memory) and disk media, e.g. when the hybrid drive is in cache mode according to various embodiments.

FIG. 3 shows an illustration 300 describing data allocation and management for the NVM and disk media in a hybrid drive used in the phone server according to various embodiments. In an implementation of various embodiments, an ATA8 NV cache command set is used. The hybrid drive interface to the host may be as shown in FIG. 2. In other words, in this case, the host can only write to the NVM through ATA8 NV cache PIN command. In order to partition the NVM, the host first may PIN LBA starting 0 till certain LBA x so that the partition table can be PINNED to the NVM. With the partition table created, the NVM can be partitioned to multiple partitions to manage. FIG. 3 shows one example of the NVM with 3 partitions. The $1^{st}$ partition 304 may mainly be to keep the phone server OS and its applications. The $2^{nd}$ partition 306 may be for the HybridFS 302 to keep metadata and buffering for small sized file data determined by the HybridFS 302. The $3^{rd}$ partition 308 may keep hot user data (in other words: frequently access user data). Cold user data (in other words: infrequently access user data) may be kept in the disk media 310. The dirty data in the NVM may be scheduled to flush to the (e.g. disk) media 310 when the disk is powering on to serve user requests requiring accessing the disk media 310. Dirty data in the NVM are the data that are more updated than the copy stored in the disk.

According to various embodiments, NVM management for using a hybrid drive with HybridFS may be provided. For example for the storing of the hot file data 308, a cache method may be provided. The cache method may work fully automatic or with user input.

According to various embodiments, a fixed location may be used to keep FS (file system) related data and file metadata.

According to various embodiments, industry standard ATA8 NV cache commands sets may be used to configure the whole NVM as pinned area. The NVM may be partitioned and mounted to the system.

According to various embodiments, with HybridFS, all the metadata may be stored in the NVM, and therefore, the metadata accesses all can be served by the NVM. Through this, the system performances may be improved and power consumption may be reduced. In addition, the HybridFS may write to the disk media in a log fashion, and it may contain a component to performance garbage collection, and it is suitable to manage the shingled writing disk without shingled translation layer to be implemented inside the disk drive, meaning that the hybrid drive in the phone server may be either hybrid drive consisting of NVM and conventional magnetic recording media or the hybrid drive consisting of NVM and shingled magnetic recording media.

Figure 4:
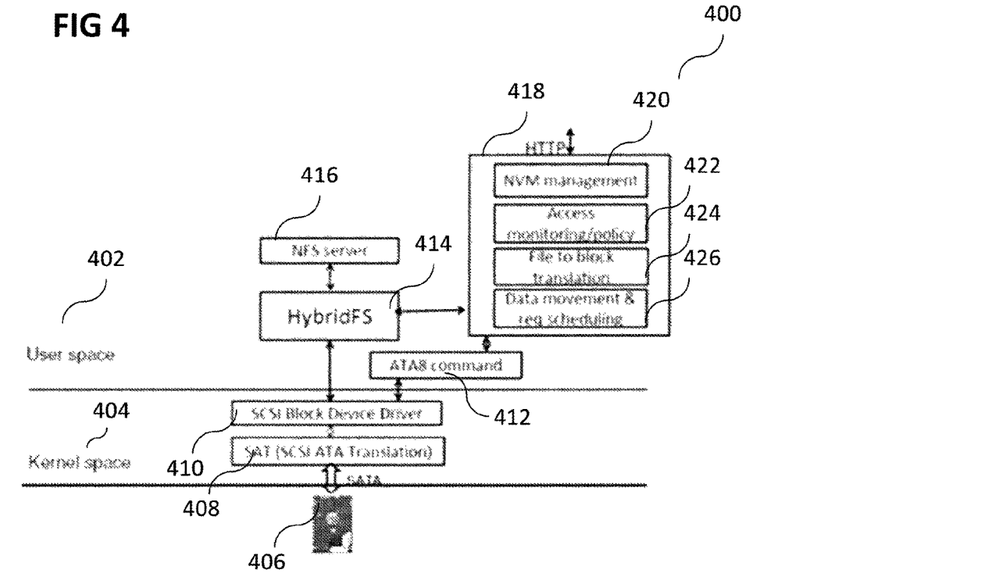
FIG. 4 shows a phone server software architecture, e.g. with ATA8 NV cache command sets to access the NVM according to various embodiments.

FIG. 4 shows an illustration 400 of the software implementation architecture according to various embodiments in a Linux system. It is for the situation when the NVM in the hybrid drive is accessed through ATA8 NV cache commands 412. A NFS (network file system) server 416 may access a HybridFS 414. There may be four main modules related to NVM file management and data movement, like indicated by block 418. A NVM manager module 420 may manage file inside the NVM. An access monitoring & policy module 422 may monitor data access and may determine the data movements. A file to block mapping module 424 may translate files to corresponding block address. A request scheduling module 426 (or a data movement and request scheduling module) may schedule the request sending down based on current spindle power states. For example, a FLUSH command may be sent to the NVM during the spindle power is on to serve a user request from the disk media 406. The NVM access requests may be sent through the ATA NV cache command sets. For example, a version of the HybridFS 414 may be implemented at the user level 402. The HybridFS 414 may access the disk media 406 through standard read/write commands that pass through standard SCSI block device driver 410 and SCSI ATA translation layer 408 build in the Linux kernel 404 and then to the hybrid disk drive 406. The HybridFS 414 may access the NVM once the LBAs have been PINNED. To access the NVM, the HybridFS 414 may send read/write commands to the PINNED LBAs, and the disk firmware can direct data accesses to the NVM.

Figure 5:
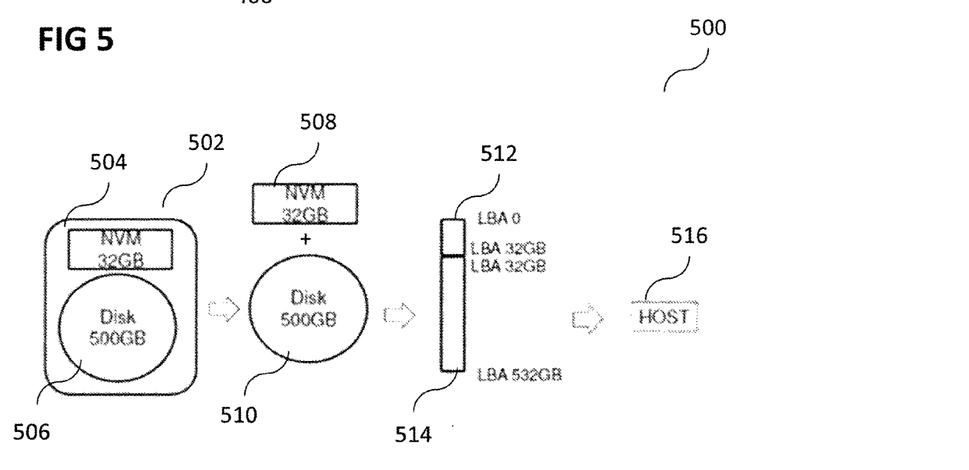
FIG. 5 shows a hybrid drive export to a host as a banded drive according to various embodiments.

FIG. 5 shows an illustration 500 of an example showing how a hybrid drive 502 (including a NVM 504 and a disk media 506) exports both its NVM 508 and disk media storages 510 to the host 516. The interface to the host may follow a banded drive standard currently discussed in the T13. The hybrid drive may export its address as a continuous storage space as shown in FIG. 5 with additional information indicating that first 32 GB space 512 is from the NVM and the rest 514 of the storage space is from the disk media. In other words, FIG. 5 shows an illustration 500 of a hybrid drive 502 in a banded mode. According to various embodiments, the hybrid drive 502 may present both the addressable space of the NVM 504 and of the disk media 506 to the host 516. The host 516 may directly access the NVM 504 through standard SATA commands.

Figure 6:
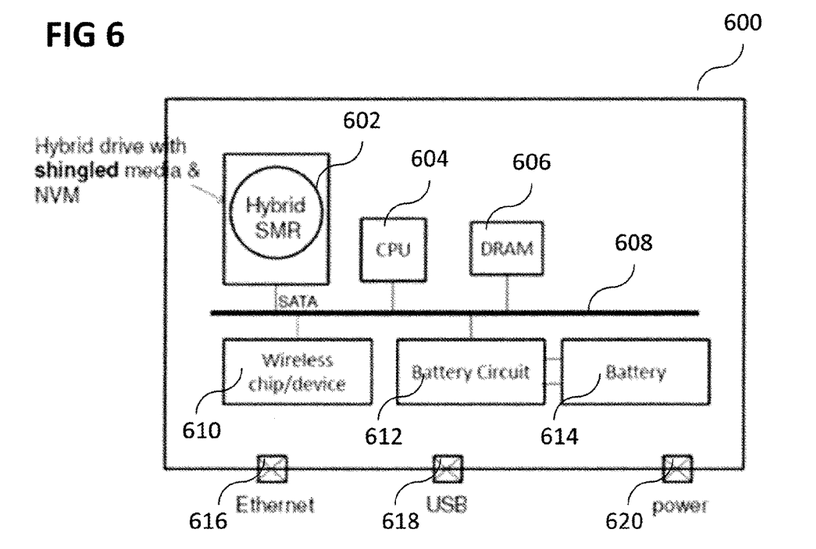
FIG. 6 shows a hardware architecture of the phone server, e.g. embedded with a hybrid disk according to various embodiments.

FIG. 6 shows one of the hardware architectures of the phone server 600. In this architecture, the phone server 600 may include a hybrid drive 602 which may be either the device containing NVM and conventional writing disk media, or a device containing NVM and a Shingled Magnetic Recording (SMR) disk. A general purpose file system adopted to manage the hybrid drive may not be used directly to manage SMR disk. With the HybridFS according to various embodiments adopted, it may be possible to use hybrid drive with SMR disk in the phone server 600. The phone server 600 may further include a central processing unit (CPU) 604, a dynamic random access memory (DRAM) 606, a wireless chip (or a wireless device) 610, a battery circuit (or a power circuit) 612, and a battery 614. The phone server 600 may have an Ethernet interface 616. The phone server 600 may have a Universal Serial Bus (USB) interface 618. The phone server 600 may have a power supply interface 620. With the HybridFS according to various embodiments, the hybrid drive 602 may use shingled writing media for large capacity. The components of the phone server 600 may be connected using a connection 608, for example a cable or a bus, for example a SATA (serial advanced technology attachment) connection.

Figure 7:
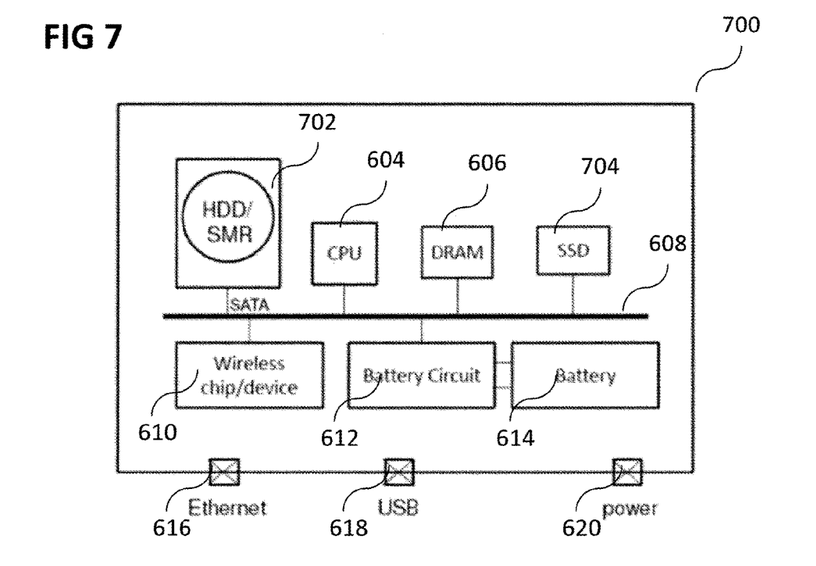
FIG. 7 shows a hardware architecture of the phone server embedded with a disk drive and NVM/SSDM (solid state drive medium) according to various embodiments.

The hybrid drive 602 may interface to the host without exposing NVM storage capacity as shown in FIG. 2. The host needs to access to the NVM through ATA8 NV cache command sets. FIG. 3 describes, in this case, how to manage the data in the NVM and disk media and FIG. 4 shows its corresponding software implementation architecture. For the situation when the hybrid drive exposes its storage capacity to the host as shown in FIG. 5, the data management of the NVM and implementation architecture may be as will be described below with reference to FIG. 8 and FIG. 9 respectively for this case. The data management of the NVM and implementation described in FIG. 8 and FIG. 9 may also be used to manage the phone server embedded with two separate storage devices as shown in FIG. 7. For two storage devices, one can be either conventional hard disk drive or a SMR disk drive, the other can be NVM or SSD (solid state drive) connected to the system bus. For this architecture, both of the capacity of the storage devices will be presented to the host and allow it access them directly.

FIG. 7 shows a further phone server 700 according to various embodiments. Various components of the phone server 700 may be similar or identical to components of the phone server 600 of FIG. 6, so that the same reference signs may be used for these components, and duplicate description may be omitted. The phone server 700 may, instead of a hybrid drive, include a hard disk drive 702 (which may be a conventional writing disk media or a Shingled Magnetic Recording (SMR) disk) and a solid state drive 704. In other words, FIG. 7 shows an alternative hardware architecture for banded mode.

Figure 8:
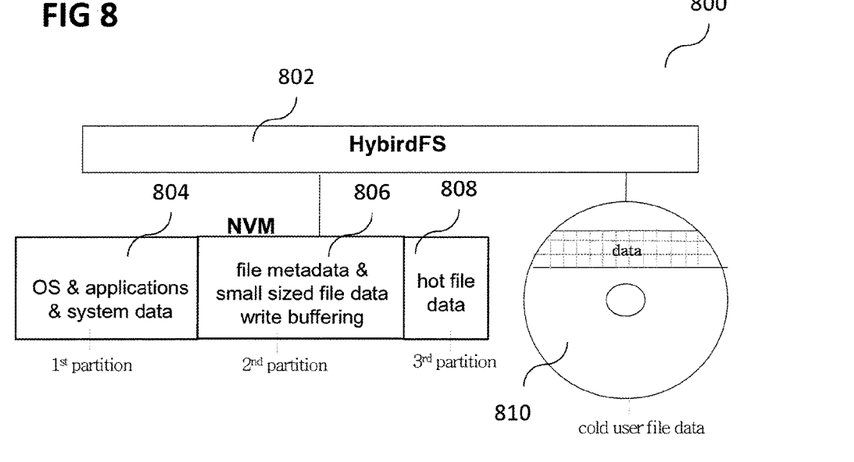
FIG. 8 shows an illustration of data allocation and management for NVM and disk media, e.g. when the hybrid drive is in banded mode according to various embodiments.

FIG. 8 shows an illustration 800 of the data allocation and management for the NVM and disk media, for example using the HybridFS 802 for an implementation of a banded drive or two devices. Three partitions 804, 806 and 808 may be created when the hybrid drive exports its NVM storage. In a further embodiment, the phone server may contain two separate storages as shown in FIG. 7. Both the NVM/SSD and disk media 810 may be accessed through standard read/write commands. The data stored in the three partitions 804, 806, 808 and the disk media 810 may be the same as shown in the FIG. 3. The difference may be that the disk media may not keep a copy of the data stored the NVM/SSD. According to various embodiments, SATA standard READ/WRITE commands may be used to access the NVM.

Figure 9:
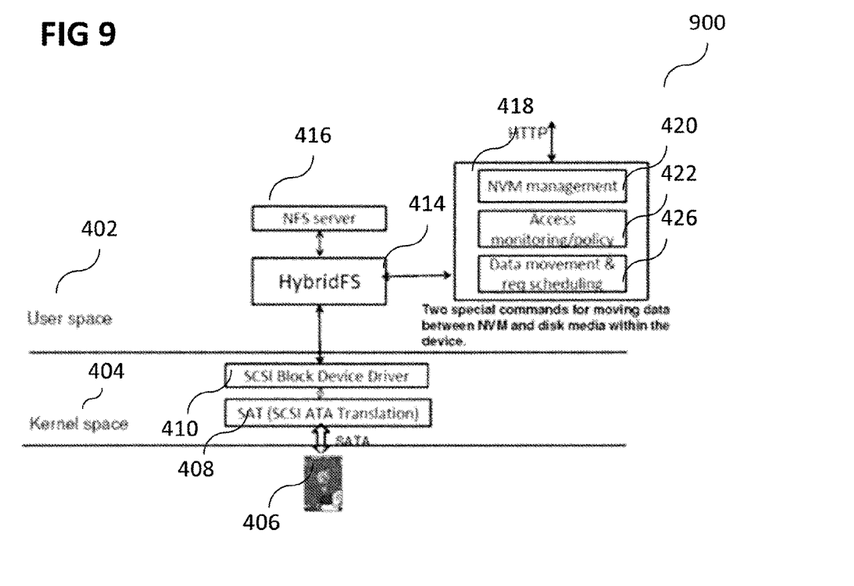
FIG. 9 shows a phone server software architecture, e.g. with standard read/write commands to access the NVM according to various embodiments.

FIG. 9 shows an illustration 900 of the phone sever software architecture. It may be almost the same as the one shown in FIG. 4, so that the same reference signs may be used for similar or identical components, and duplicate description may be omitted. One difference is that in this architecture there is no ATA command interface needed to access the NVM. The other difference is that there is no file to block mapping module as shown in FIG. 4. This module is needed only for ATA8 NV cache command sending.

If the phone server only has a hybrid drive as its storage shown in FIG. 6, and the NVM in the hybrid drive can expose its storage capacity to the host as shown in FIG. 5, to have efficient data movement between the NVM and disk media, according to various embodiments, two commands may be implemented in the hybrid drive firmware for the data movement directly between these two media without passing through the host. According to various embodiments, one command may be for the movement from the NVM to the (disk) media and the other command may be for the movement from the (disk) media to the NVM. The two commands may be issued by the host and the hybrid drive may complete the commands execution without the host to be involved. This is not like the conventional way to move the data among different tiers which needs to send read command to read data from one media to the host first and then the host send write command to the other media to complete data movement. It is much more efficient to complete data movement within the drive as the I/O path normally is the bottle neck of the system.

Figure 10:
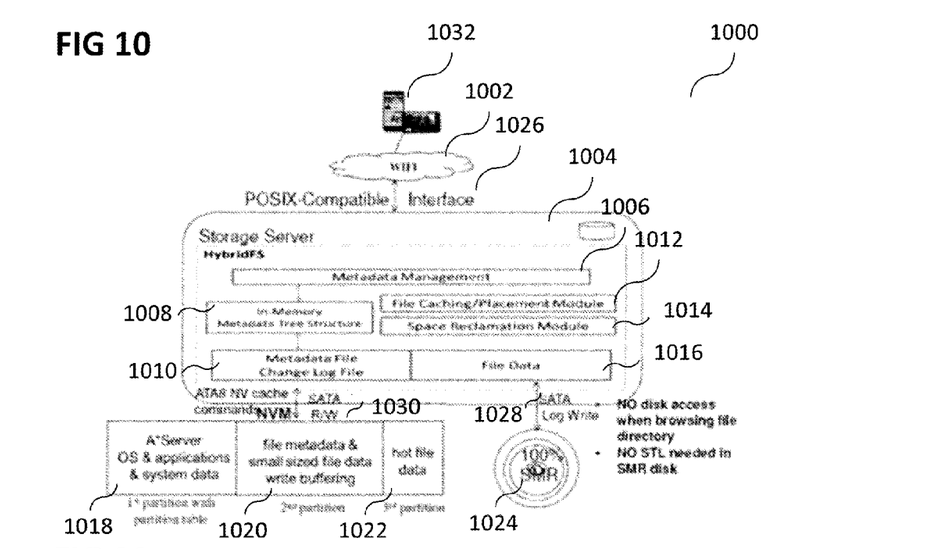
FIG. 10 shows an illustration of a phone server architecture with HybridFS, e.g. with ATA8 NV cache commands to access the NVM according to various embodiments.

FIG. 10 shows an illustration 1000 of an architecture of a storage server 1004 (for example the storage server phone server architecture) with HybridFS according to various embodiments. In this architecture, the NVM (including for example partitions 1018, 1020, and 1022, for example like described above) may need to be accessed through ATA8 NV command sets 1030. Furthermore, a Shingled Magnetic Recording (SMR) disk 1024 may be accessed using an SATA interface 1028. For example, the storage server 1004 may be accessed using a POSIX-compatible interface 1026 via WiFi 1002 from a mobile device 1032, for example using Android operating system or an iOS. The HybridFS in the storage server 1004 may include a metadata management circuit 1006, an in-memory metadata tree structure 1008, a file caching/placement module 1012, a space reclamation module 1014, a metadata file and a change log file 1010, and file data 1016.

According to various embodiments, there may be no disk access when browsing the file directory.

According to various embodiments, no STL may be required in the SMR disk 1024. STL (Shingled Translation Layer) is a data management layer that is implemented inside a shingled disk drive so that the shingled disk drive can be used as a conventional disk drive for hosts to issue unrestricted read and write commands.

Figure 11:
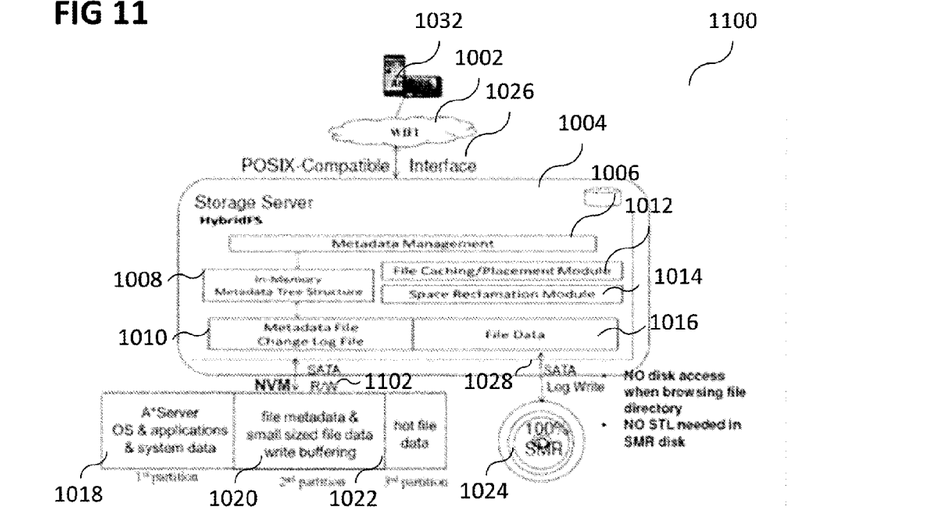
FIG. 11 shows an illustration of phone server architecture with HybridFS, e.g. with standard read/write commands to access the NVM according to various embodiments.

FIG. 11 shows an illustration 1100 of an architecture of a storage server (for example the phone server architecture) with HybridFS with standard read/write commands to access the NVM/SSD, like indicated by interface 1102. Various other components shown in FIG. 11 may be similar or identical to components shown in FIG. 10, so that the same reference signs may be used and duplicate description may be omitted. In cases of both FIG. 10 or FIG. 11, the disk media 1024 can be either a conventional writing disk or a SMR disk.

According to various embodiments, a HybridFS for a phone server may be provided.

According to various embodiments, devices and methods may be provided which extend battery life and improve performances.

According to various embodiments, a system and method for hand phones to expend their storage capacity through a shared hybrid thin mobile storage may be provided, for example by a phone server.

According to various embodiments, a data management and file system for a portable mobile storage system (for example for a phone server) may be provided.

According to various embodiments, devices and methods may be provided to reduce disk accesses and improve performance. The disk may be powered up only when accessing cold file data.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A storage device comprising:
   a first memory comprising a magnetic recording medium and configured to store user data and not metadata;
   a solid state drive comprising a second memory, wherein the second memory is separate from the first memory, wherein the second memory is solid state memory and is configured to store metadata and wherein the metadata describes the user data;
   a first interface configured to access the first memory according to a first communication protocol; and
   a second interface configured to access the second memory according to a second communication protocol, wherein the second communication protocol is different than the first communication protocol.

2. The storage device of claim 1, wherein the second communication protocol comprises an ATA8 NV command set or a SATA command set.

3. The storage device of claim 1, wherein the second interface is configured to provide access to a pinned portion of the second memory.

4. The storage device of claim 1, further comprising a processor configured to (i) receive a command from a host to copy data between the first memory and the second memory, and (ii) transfer the copied data between the first memory and the second memory independent of whether the host is able to access an address of the first memory or the second memory.

5. The storage device of claim 4, wherein the copying of the data between the first memory and the second memory is free from the host receiving the data.

6. The storage device of claim 1, wherein the magnetic recording medium is a shingled magnetic recording disk.

7. A method for controlling a storage device, the method comprising:
   controlling a first memory comprising a magnetic recording medium to store user data and not metadata;
   controlling a second memory to store metadata, wherein the second memory is separate from the first memory, wherein the second memory is solid state memory and is in a solid state drive, and wherein the metadata describes the user data;
   accessing the first memory via a first interface and according to a first communication protocol; and
   accessing the second memory via a second interface and according to a second communication protocol, wherein the second communication protocol is different than the first communication protocol.

8. The method of claim 7, wherein the second communication protocol comprises an ATA8 NV command set or a SATA command set.

9. The method of claim 7, further comprising controlling the second interface to provide access to a pinned portion of the second memory.

10. The method of claim 7, further comprising:
    receiving a command from a host to copy data between the first memory and the second memory; and
    transferring the copied data between the first memory and the second memory independent of whether the host is able to access an address of the first memory or the second memory.

11. The method of claim 10, wherein copying of data between the first memory and the second memory is free from the host receiving the data.

12. The method of claim 7, wherein the magnetic recording medium is a shingled magnetic recording disk.

13. The storage device of claim 1, further comprising:
    a hybrid file system configured to (i) generate a first command to read from or write to the magnetic recording medium, (ii) generate a second command to read from or write to the second memory, and (iii) send the second command to pinned logical block addresses of the storage device;
    a block device driver configured to receive the first command;
    an advanced technology attachment translation module configured to pass the first command from the block device driver to the storage device; and
    a non-volatile memory module configured to receive the second command and access the second memory based on the second command,
    wherein the storage device accesses the magnetic recording medium based on the first command,
    wherein the hybrid file system is implemented in a user space, and
    wherein the block device driver and the advanced technology attachment translation module are implemented in a kernel space.

14. The storage device of claim 13, wherein data is transferred directly between the second memory and the magnetic recording medium based on an advanced technology attachment command generated in the user space.

15. The storage device of claim 13, wherein:
    the second memory is partitioned into a first portion, a second portion and a third portion;
    the first portion is configured to store operating system data;
    the second portion is configured to store the metadata;
    the third portion is configured to store first data; and
    the first data is more frequently accessed than the user data.

16. The storage device of claim 15, wherein the hybrid file system is configured to, based on the second command, generate an advanced technology attachment command to access the first portion, the second portion, or the third portion of the second memory.

17. The storage device of claim 15, wherein the hybrid file system is configured to, without generation of an advanced technology attachment command and based on the second command, access the first portion, the second portion, or the third portion.

* * * * *